(12) United States Patent
Heckel et al.

(10) Patent No.: US 8,342,160 B2
(45) Date of Patent: Jan. 1, 2013

(54) ENGINE AIR MANAGEMENT SYSTEM

(75) Inventors: Scott P. Heckel, Stoughton, WI (US);
Jerald J. Moy, Oregon, WI (US); Scvott W. Schwartz, Cottage Grove, WI (US);
Andrew P. Perr, Columbus, IN (US);
Mark V. Holzmann, Stoughton, WI (US); Peter K. Herman, Stoughton, WI (US); Michael T. Zuroski, Sun Prairie, WI (US); Brian W. Schwandt, Fort Atkinson, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

(21) Appl. No.: 13/434,973

(22) Filed: Mar. 30, 2012

(65) Prior Publication Data

US 2012/0186566 A1    Jul. 26, 2012

Related U.S. Application Data (62) Division of application No. 12/369,049, filed on Feb. 11, 2009, now Pat. No. 8,146,574.

(51) Int. Cl.
*F02B 77/00* (2006.01)

(52) U.S. Cl. ...................................... 123/572
(58) Field of Classification Search .......... 123/572–574, 123/41.86
See application file for complete search history.

(56) References Cited

U.S. PATENT DOCUMENTS

| | | | |
|---|---|---|---|
| 3,494,339 A | 2/1970 | Fernandez et al. | |
| 4,253,954 A | 3/1981 | Midkiff et al. | |
| 4,653,457 A * | 3/1987 | Stege | 123/572 |
| 4,861,359 A | 8/1989 | Tettman | |
| 4,878,929 A | 11/1989 | Tofsland et al. | |
| 5,471,966 A | 12/1995 | Feuling | |
| 5,479,907 A * | 1/1996 | Walker, Jr. | 123/573 |
| 5,487,371 A | 1/1996 | Beckman et al. | |
| 5,564,401 A * | 10/1996 | Dickson | 123/573 |
| 5,697,349 A | 12/1997 | Blum | |
| 6,009,846 A | 1/2000 | Walker | |
| 6,123,061 A | 9/2000 | Baker et al. | |
| 6,187,073 B1 | 2/2001 | Gieseke et al. | |
| 6,261,333 B1 | 7/2001 | Dickson | |
| 6,290,738 B1 | 9/2001 | Holm | |
| 6,422,224 B1 * | 7/2002 | Walker, Jr. | 123/572 |
| 6,557,536 B2 | 5/2003 | Burgess | |
| 6,561,171 B2 * | 5/2003 | Burgess | 123/572 |
| 6,726,738 B1 | 4/2004 | Walker, Jr. | |
| 6,814,041 B1 | 11/2004 | Cheng et al. | |
| 7,017,563 B2 | 3/2006 | Dworatzek et al. | |
| 7,377,954 B2 | 5/2008 | Gunderson et al. | |
| 7,406,960 B2 | 8/2008 | Knauf et al. | |
| 7,497,301 B2 | 3/2009 | Cheng et al. | |
| 7,758,678 B2 | 7/2010 | Yoshida et al. | |
| 2004/0083697 A1 | 5/2004 | Niakin | |
| 2004/0144375 A1 | 7/2004 | Hunter | |
| 2005/0211232 A1 | 9/2005 | Dushek et al. | |
| 2006/0242933 A1 | 11/2006 | Webb et al. | |
| 2008/0257160 A1 | 10/2008 | Yoshida et al. | |

* cited by examiner

*Primary Examiner* — M. McMahon (74) *Attorney, Agent, or Firm* — Andrus, Sceales, Starke & Sawall, LLP (57) ABSTRACT

An engine air management system is provided for an internal combustion engine generating blowby gas in a crankcase containing engine oil and oil aerosol. The system includes combinations of two or more of an air-oil separator, an air filter, and an acoustic silencer.

8 Claims, 9 Drawing Sheets

ENGINE AIR MANAGEMENT SYSTEM

CROSS REFERENCE TO RELATED APPLICATION

This application is a division of U.S. patent application Ser. No. 12/369,049, filed Feb. 11, 2009.

BACKGROUND AND SUMMARY

The invention relates to engine air management systems for internal combustion engines.

Internal combustion engines take in large amounts of air and also generate a relatively small amount of blowby gas in the crankcase containing engine oil and oil aerosol. The air management system may include an air intake filter as well as an air-oil separator having an inlet receiving blowby gas and oil aerosol from the crankcase, an air outlet discharging clean blowby gas, and an oil outlet discharging scavenged separated oil.

The present invention arose during continuing development efforts in the above technology.

DETAILED DESCRIPTION

Figure 1:
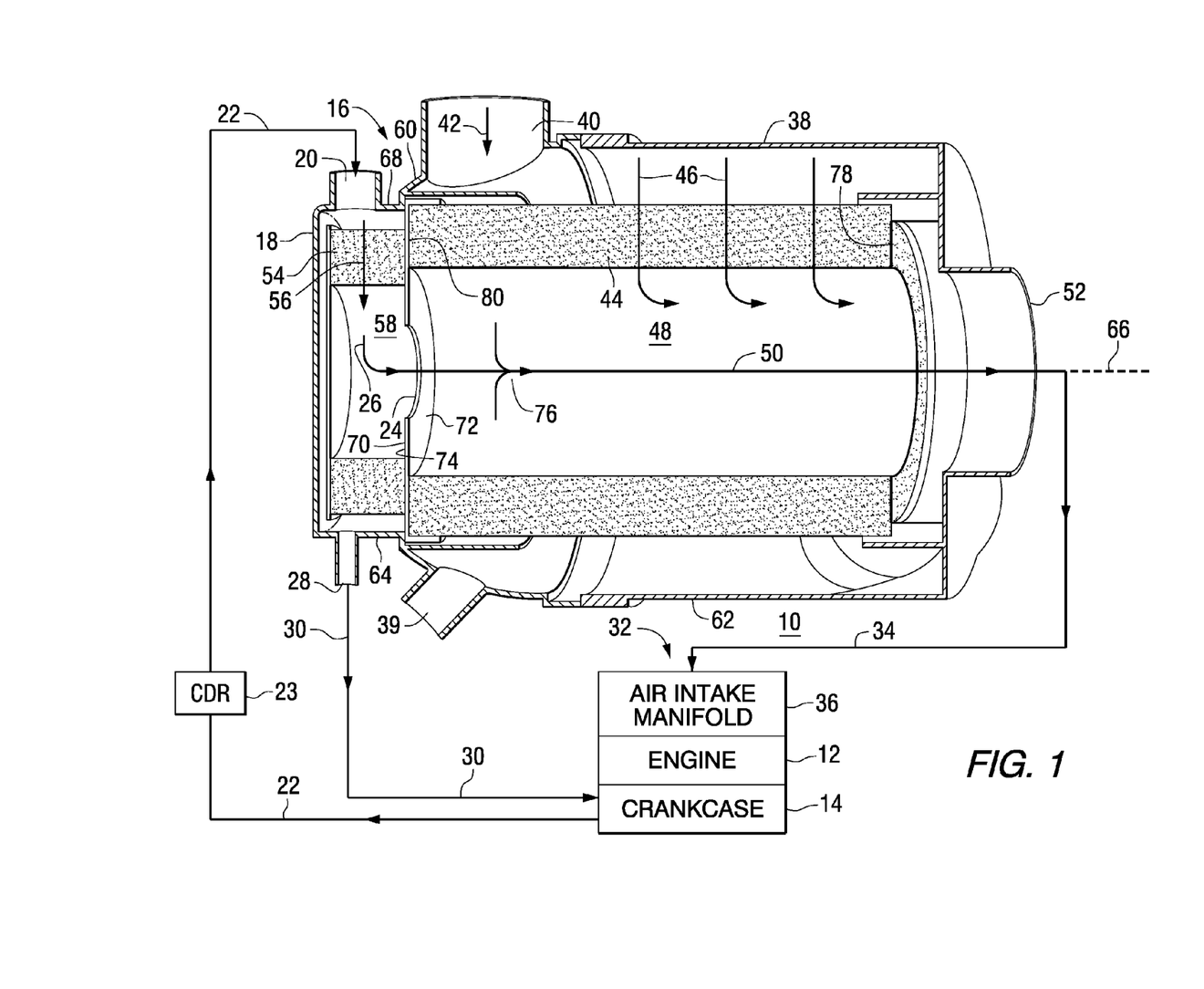
FIG. 1 is a schematic illustration of an engine air management system in accordance with the invention.

FIG. 1 shows an engine air management system 10 for an internal combustion engine 12 generating blowby gas in a crankcase 14 containing engine oil and oil aerosol. In the embodiment of FIG. 1, the system includes a combined crankcase ventilation filter and air cleaner 16. The system includes an air-oil separator 18 having an inlet 20 receiving blowby gas and oil aerosol as shown at arrow 22 from crankcase 14, and having an air outlet 24 discharging clean blowby gas as shown at arrow 26, and having an oil outlet 28 discharging scavenged separated oil as shown at arrow 30 back to crankcase 14. The system further includes a combustion air intake 32 supplying combustion air to engine 12 as shown at arrow 34, to air intake manifold 36, or to a turbocharger or supercharger, etc. The combustion air intake includes an air filter 38 supplying clean combustion air to the engine as shown at arrow 34. Air filter 38 is a standard air filter and receives incoming ambient air at inlet 40 as shown at arrow 42, which air is then filtered by flowing radially inwardly through annular air filter element 44 as shown at arrows 46, which air flows into hollow interior 48 of the annular filter element 44, and then flows axially as shown at 50 to outlet 52 to supply the noted combustion air as shown at arrow 34. Air-oil separator 18 is provided by an annular coalescing filter media element 54 through which the blowby gas and oil aerosol flow radially inwardly as shown at arrow 56 into hollow interior 58 and then the clean blowby gas 26 turns and flows axially through outlet 24 and joins the cleaned combustion air in hollow interior 48 of air filter element 44 to flow axially as shown at 50 through outlet 52 and then to the engine as shown at arrow 34. In the preferred embodiment, air-oil separator 18 is a coalescer. In another embodiment, the air-oil separator of the crankcase ventilation filter is an impactor separator. As is known, air filters such as 38 may include a purge outlet such as 39, which may include a purge valve, for discharging debris or particulate. The embodiment in FIG. 1 is a closed crankcase ventilation (CCV) system, wherein the clean blowby gas 26 is returned to the engine. In other embodiments, to be described, an open crankcase ventilation (OCV) system is provided, wherein the clean blowby gas is vented to atmosphere. In a CCV system as in FIG. 1, it is preferred that a crankcase depression regulator (CDR) 23 be provided, either in the blowby gas and oil aerosol conduit at 22, or in the combustion air conduit at 34, as is known.

In the preferred embodiment, air outlet 24 of air-oil separator 18 supplies clean blowby gas to the combustion air intake 32 as shown at arrows 26, 50, 34. Combustion air flows from upstream to downstream through the combustion air intake, including through the air filter, to the engine, as shown at arrows 42, 46, 50, 34. In FIG. 1, air outlet 24 of air-oil separator 18 supplies clean blowby gas to the combustion air intake downstream of air filter element 44 of air filter 38.

Figure 2:
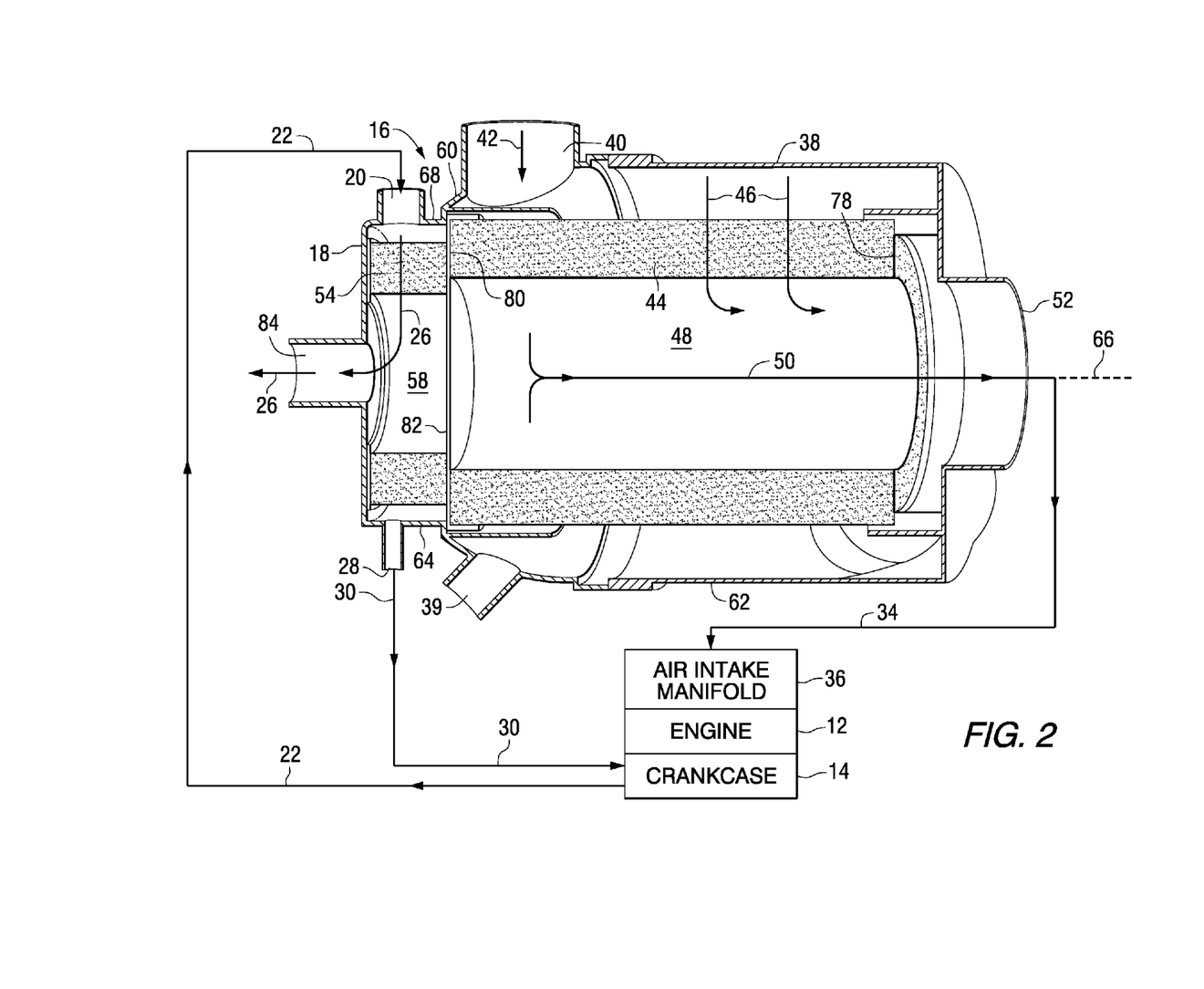
FIG. 2 is like FIG. 1 and shows another embodiment.

The combined crankcase ventilation filter and air cleaner is housed in a housing 60 having a plurality of ports 40, 20, 52, 28, 24, and first and second chambers 62 and 64. Chamber 62 contains air filter element 44 of the air filter. Combustion air flows from upstream to downstream through port 40 then through air filter element 44 in chamber 62 then through port 52 to the engine. Chamber 64 contains the air-oil separator. Blowby gas and oil aerosol flow through port 20 to the air-oil separator in chamber 64. The housing extends axially along axis 66. First and second chambers 62 and 64 are axially aligned in housing 60 in axially stacked end-to-end relation. Housing 60 has an axially extending outer wall 68, and a dividing wall 70 extending radially inwardly from outer wall 68 between first and second chambers 62 and 64 and axially separating chambers 62 and 64. Port 40 of the housing is on a first axial side of dividing wall 70, e.g. the right side 72 in the orientation of FIG. 1. Port 20 of the housing is on a second axial side of dividing wall 70, e.g. the left side 74 in the orientation of FIG. 1. Left side 74 of dividing wall 70 faces axially distally oppositely from right side 72 of dividing wall 70. Port 52 of the housing is on the noted right axial side 72 of dividing wall 70. Housing 60 has a fourth port as shown at 28, which fourth port is in second chamber 64 on the noted left side 74 of dividing wall 70 and drains scavenged separated oil as shown at arrow 30. Housing 60 has a fifth port 24, which may be an internal transfer port as shown in FIG. 1, or may be an external port as shown in FIG. 2 to be described, which fifth port 24 is in the noted second chamber 64 and discharges clean blowby gas as shown at arrow 26. In the embodiment of FIG. 1, fifth port 24 is formed through dividing wall 70 and discharges clean blowby gas axially therethrough from second chamber 64 to first chamber 62.

In FIG. 1, air filter element 44 of the air cleaner filter is an annulus having the noted hollow interior 48 and extends axially along axis 66 in first chamber 62. Combustion air flows radially inwardly as shown at arrows 46 through the annulus into hollow interior 48 and then axially as shown at arrow 50 through the noted third port 52. The noted fifth port 24 extends axially through dividing wall 70. Clean blowby gas flows as shown at arrow 26 from second chamber 64 axially through fifth port 24 into first chamber 62 and joins combustion air in hollow interior 48 of the annulus as shown at arrow 76.

Annular air filter element 44 extends axially in chamber 62 between first and second distally opposite axial ends 78 and 80. The noted third port 52 is at first axial end 78 of the annulus. Air-oil separator 18 is at the second axial end 80 of the annulus and axially spaced therefrom by dividing wall 70 therebetween. Second axial end 80 of the annulus axially faces the noted first side 72 of the dividing wall 70. Air-oil separator 18 at coalescer element 54 axially faces the noted second side 74 of dividing wall 70. In the preferred embodiment, as noted, the air-oil separator is a coalescer 54 in second chamber 64, and fifth port 24 is the noted air outlet of the air-oil separator, and fourth port 28 is the noted oil outlet of the air-oil separator.

FIG. 2 is like FIG. 1 and uses like reference numerals from above where appropriate to facilitate understanding. Dividing wall 70 of FIG. 1 is replaced in FIG. 2 by dividing wall 82 which isolates second chamber 64 from first chamber 62. Dividing wall 82 is a solid wall, without a central opening at 24 otherwise providing the noted fifth port. Instead, a fifth port 84 is provided from second chamber 64 and extends externally of housing 60 and discharges clean blowby gas externally of the housing as shown at arrow 86, which clean blowby gas may be discharged to atmosphere as shown in FIG. 2 (OCV—open crankcase ventilation), or may be returned to the engine (CCV—closed crankcase ventilation), e.g. at air intake manifold 36, separately from combustion air 34, or may be combined therewith and then supplied to air intake manifold 36.

Figure 3:
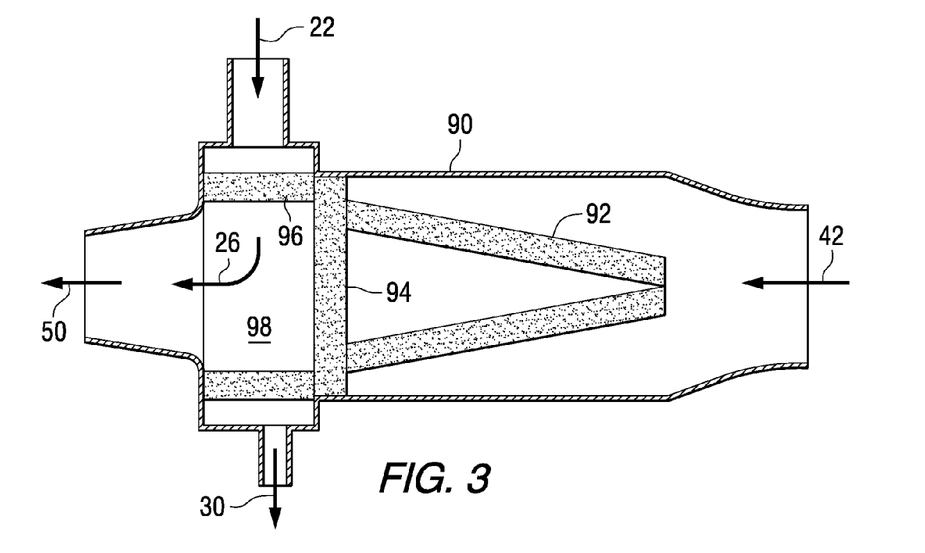
FIG. 3 schematically illustrates a further embodiment.

FIG. 3 shows a further embodiment and uses like reference numerals from above where appropriate to facilitate understanding. The combustion air intake includes a duct 90 directing combustion air 42 from upstream to downstream axially therealong, leftwardly in FIG. 3. A primary air filter element is shown at 92, and a safety or secondary air filter element is shown at 94. The air-oil separator is provided by an annular coalescer filter element 96 having a hollow interior 98 extending axially in the duct. Blowby gas 22 flows radially inwardly through annular coalescer filter 96 and joins the combustion air in hollow interior 98 and then flows axially as shown at 50, to be supplied to air intake manifold 36. Oil outlet 28 is downstream of air filter 92, 94. Blowby gas joins combustion air downstream of air filter 92, 94.

Figure 4:
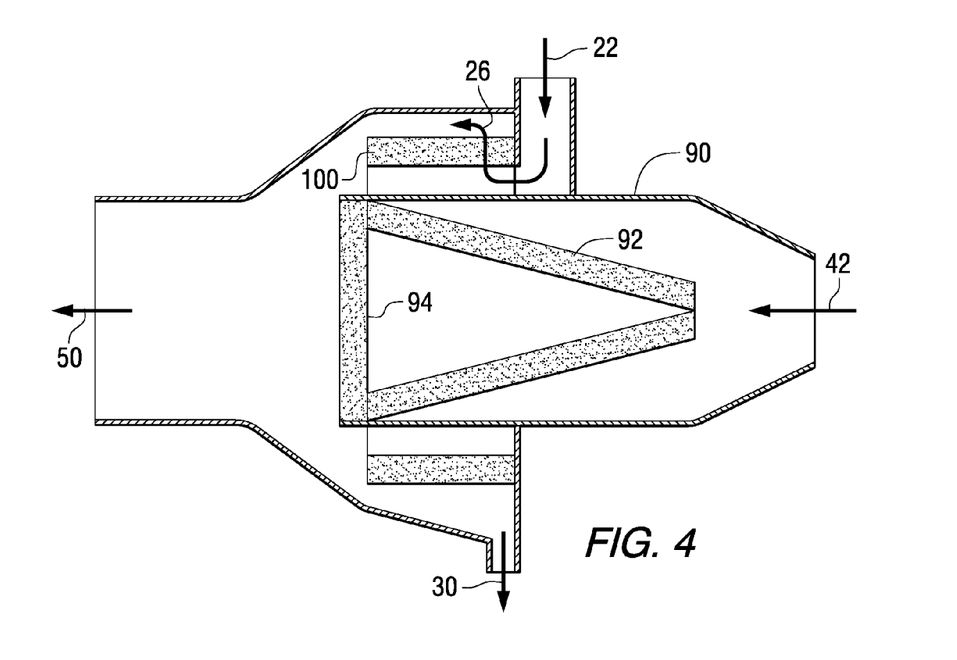
FIG. 4 is like FIG. 3 and shows another embodiment.

FIG. 4 is like FIG. 3 and uses like reference numerals from above where appropriate to facilitate understanding. Coalescer filter element 96 of FIG. 3 is replaced by coalescer filter element 100 of FIG. 4 where an inside-out flow is desired for the coalescer.

Figure 5:
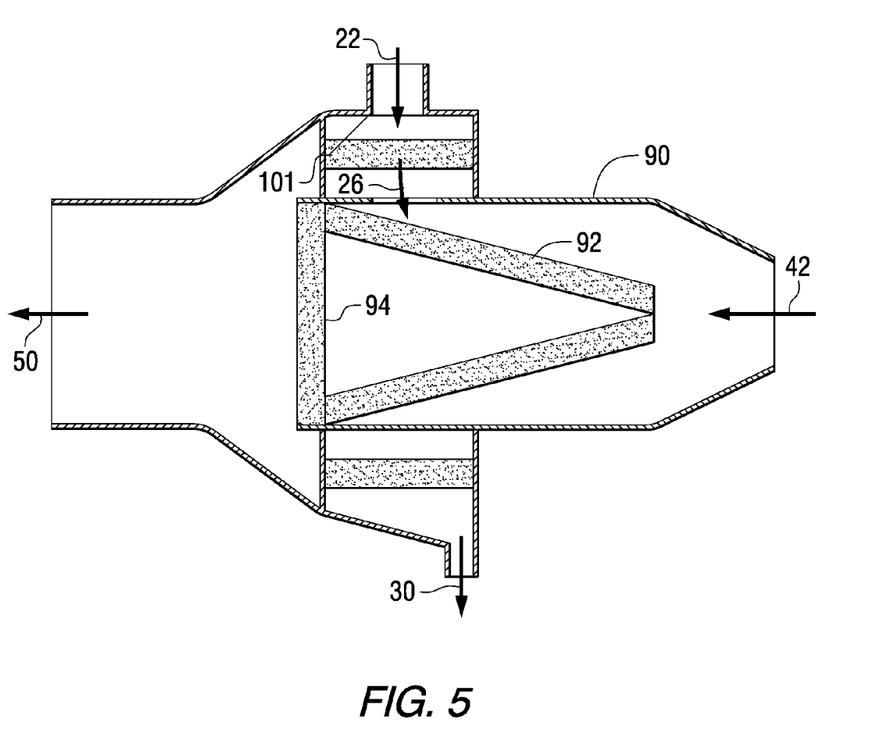
FIG. 5 is like FIG. 4 and shows another embodiment.

FIG. 5 is like FIG. 4 and uses like reference numerals from above where appropriate to facilitate understanding. Blowby gas 22, after passing through coalescer filter element 101, joins the combustion air upstream of the air filter. In the embodiments of FIGS. 3-5, the combustion air intake extends through the air-oil separator.

Figure 6:
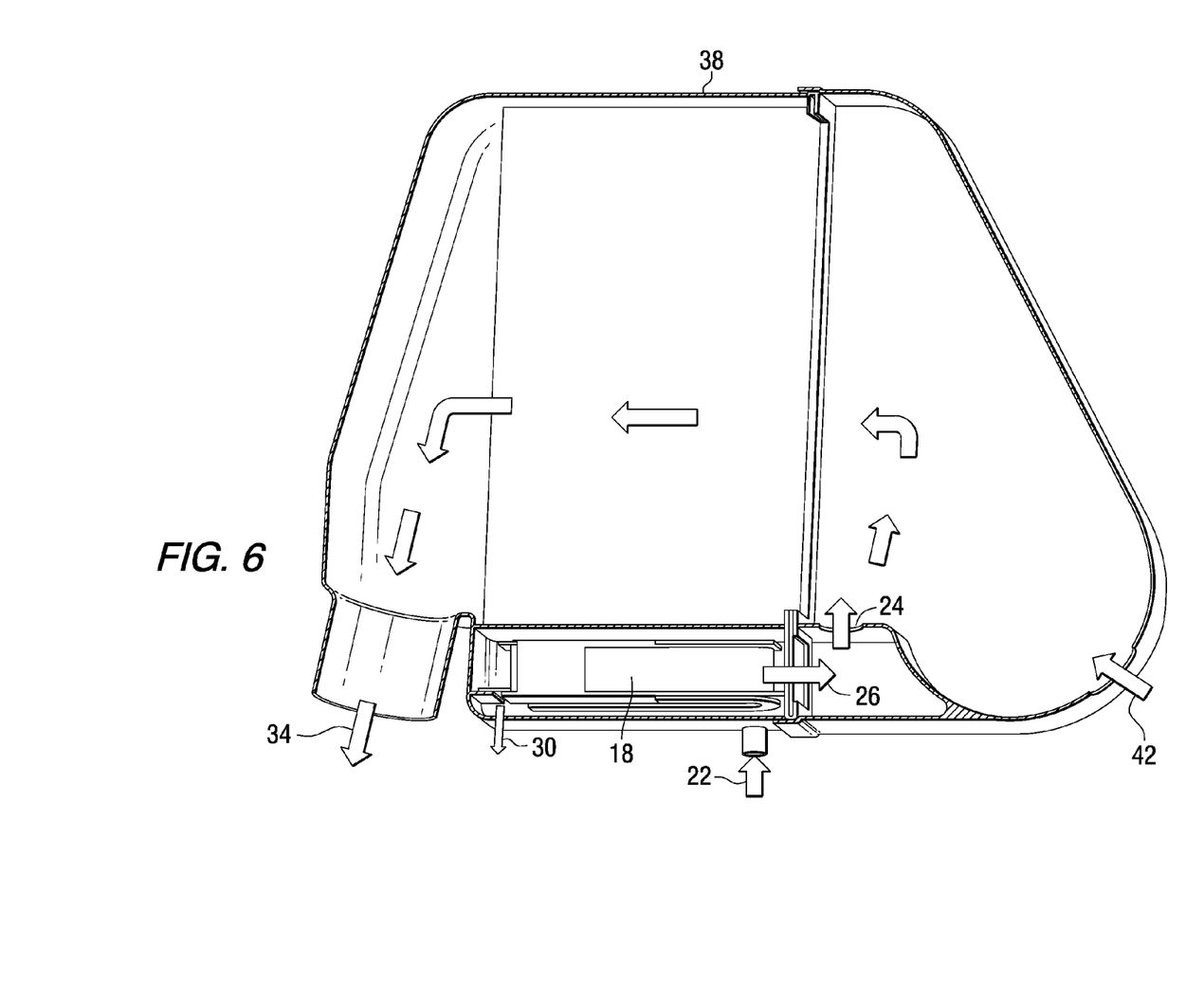
FIG. 6 schematically illustrates a further embodiment.

FIG. 6 shows a further embodiment and uses like reference numerals from above where appropriate to facilitate understanding. Clean blowby gas 26 from air-oil separator 18 joins combustion air upstream of air filter 38. This provides a CCV system.

Figure 7:
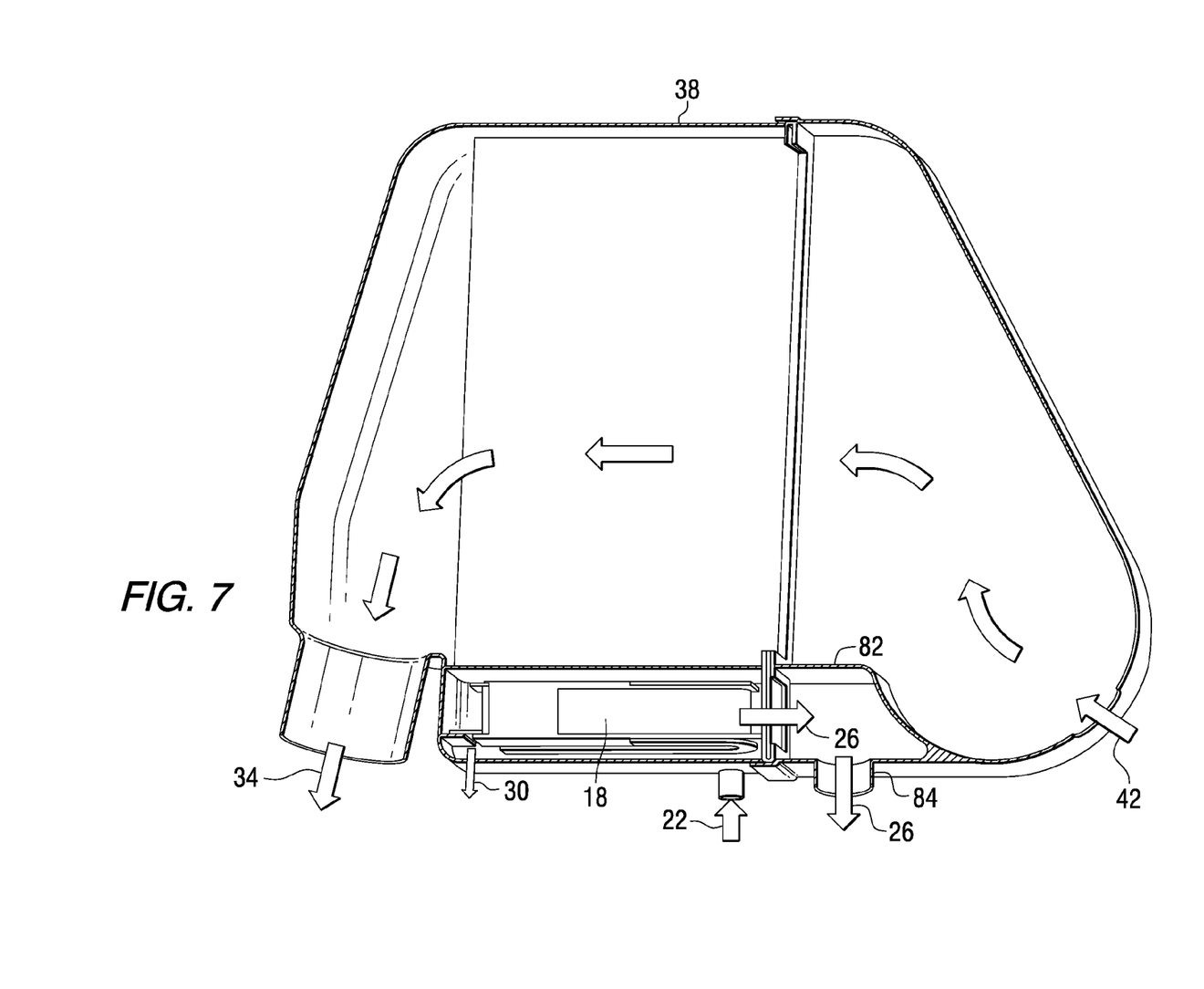
FIG. 7 is like FIG. 6 and shows another embodiment.

FIG. 7 is like FIG. 6 and uses like reference numerals from above where appropriate to facilitate understanding. Port 24 in FIG. 6 is replaced by solid dividing wall 82 in FIG. 7 such that clean blowby gas 26 is instead vented to atmosphere through port 84. This provides an OCV system. In an alternative, the clean blowby gas 26 in FIG. 7 may be returned to the engine, e.g. at air intake manifold 36, separately from combustion air 34 or may be combined therewith and then supplied to air intake manifold 36, to provide a CCV system.

Figure 8:
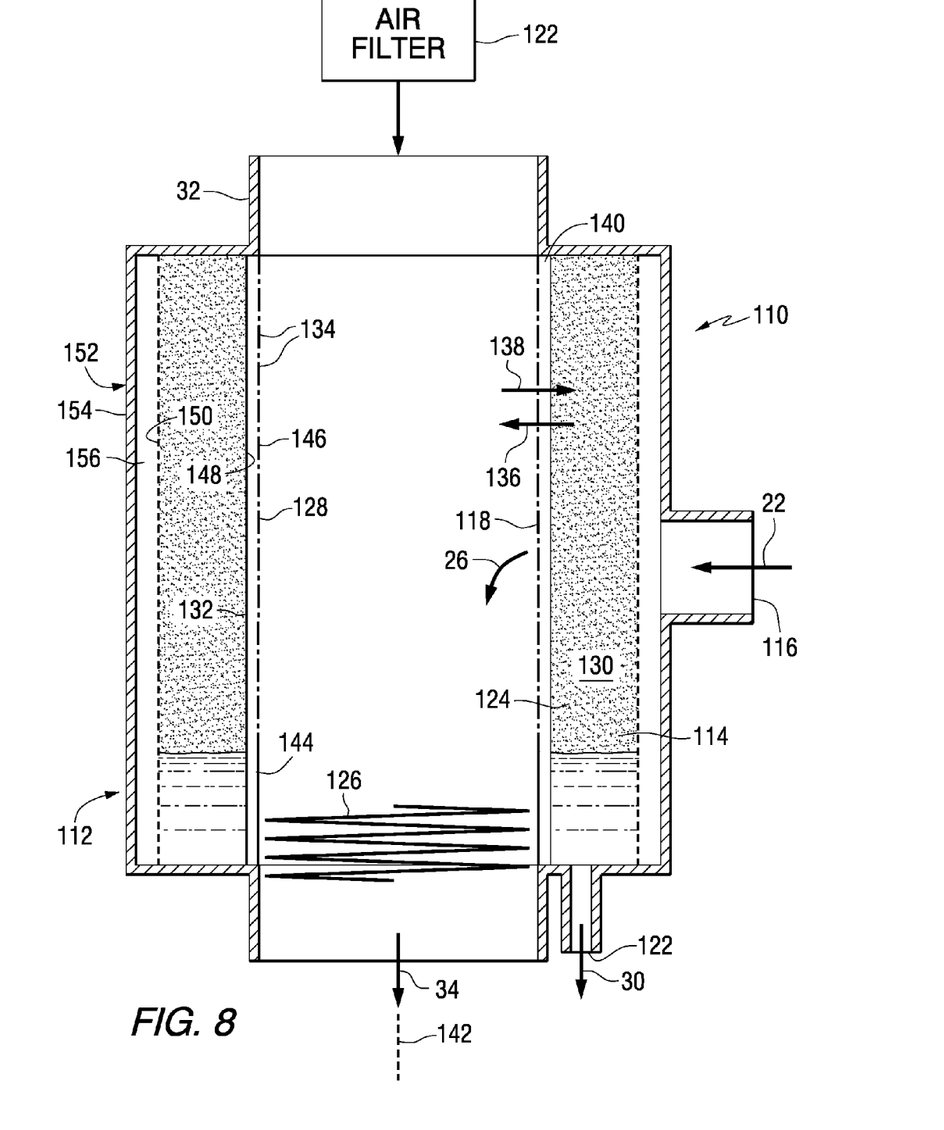
FIG. 8 schematically illustrates a further embodiment.

FIG. 8 shows a further embodiment and uses like reference numerals from above where appropriate to facilitate understanding. Engine intake air management system 110 is provided for internal combustion engine 12 as above, which engine generates blowby gas in a crankcase 14 containing engine oil and oil aerosol. The system includes a combined crankcase ventilation filter and acoustic silencer 112. The crankcase ventilation filter includes an air-oil separator 114 which has an inlet 116 receiving blowby gas and oil aerosol 22 from crankcase 14, and has an air outlet 118 discharging clean blowby gas as shown at arrow 26, and has an oil outlet 122 discharging scavenged separated oil as shown at arrow 30. The system further includes a combustion air intake 32 supplying combustion air to the engine as shown at 34. An upstream air filter may be provided as shown at 122, or may be provided as shown above. The combustion air intake includes an acoustic silencer 124 providing acoustic silencing of engine noise in the combustion air intake as schematically shown at engine noise sound waves 126 traveling back up the combustion air intake in the orientation of FIG. 8. The combustion air intake is provided by a duct 128 extending through air-oil separator 114 and through acoustic silencer 124. Air-oil separator 114 and acoustic silencer 124 each concentrically surround duct 128. In the preferred embodiment, air-oil separator 114 is a coalescer and is provided by combined coalescing and acoustical absorption media 130. Further in the preferred embodiment, a liner 132 is provided between the combustion air intake 32 at duct 128 and media 130. Liner 132 is an annular cylindrical sleeve and preferably is all of the following: a) acoustically permeable; b) gas permeable; and c) at least partially liquid impermeable. Combustion air intake 32 is preferably provided by a perforated duct 128 having perforations 134 communicating with media 130 such that blowby gas flows in a first direction 136 through perforations 134, and acoustic sound waves travel in a second opposite direction 138 through perforations 134. Media 130 and duct 128 at perforations 134 are separated by an interface gap 140. Liner 132 extends along interface gap 140.

In a further preferred embodiment, duct 128 extends axially along axis 142 at least partially vertically to have a lower portion 144 gravitationally below an upper portion 146. Upper portion 146 has the noted perforations 134. Lower portion 144 is unperforated and blocks the flow of scavenged separated oil from the air-oil separator from entering combustion air intake 32. Media 130 is an annulus extending axially along axis 142 and has a circumferential inner face 148 facing radially inwardly toward duct 128, and has a circumferential outer face 150 facing radially outwardly. A housing 152 concentrically surrounds the annulus of media 130 and has the noted inlet 116 receiving blowby gas and oil aerosol at 22 from crankcase 14. Housing 152 has an axially extending sidewall 154 spaced radially outwardly of outer face 150 of annular media 130 by an annular pressure equalization plenum 156 around the outside of media 130 facilitating uniform flow of blowby gas through the media.

Figure 9:
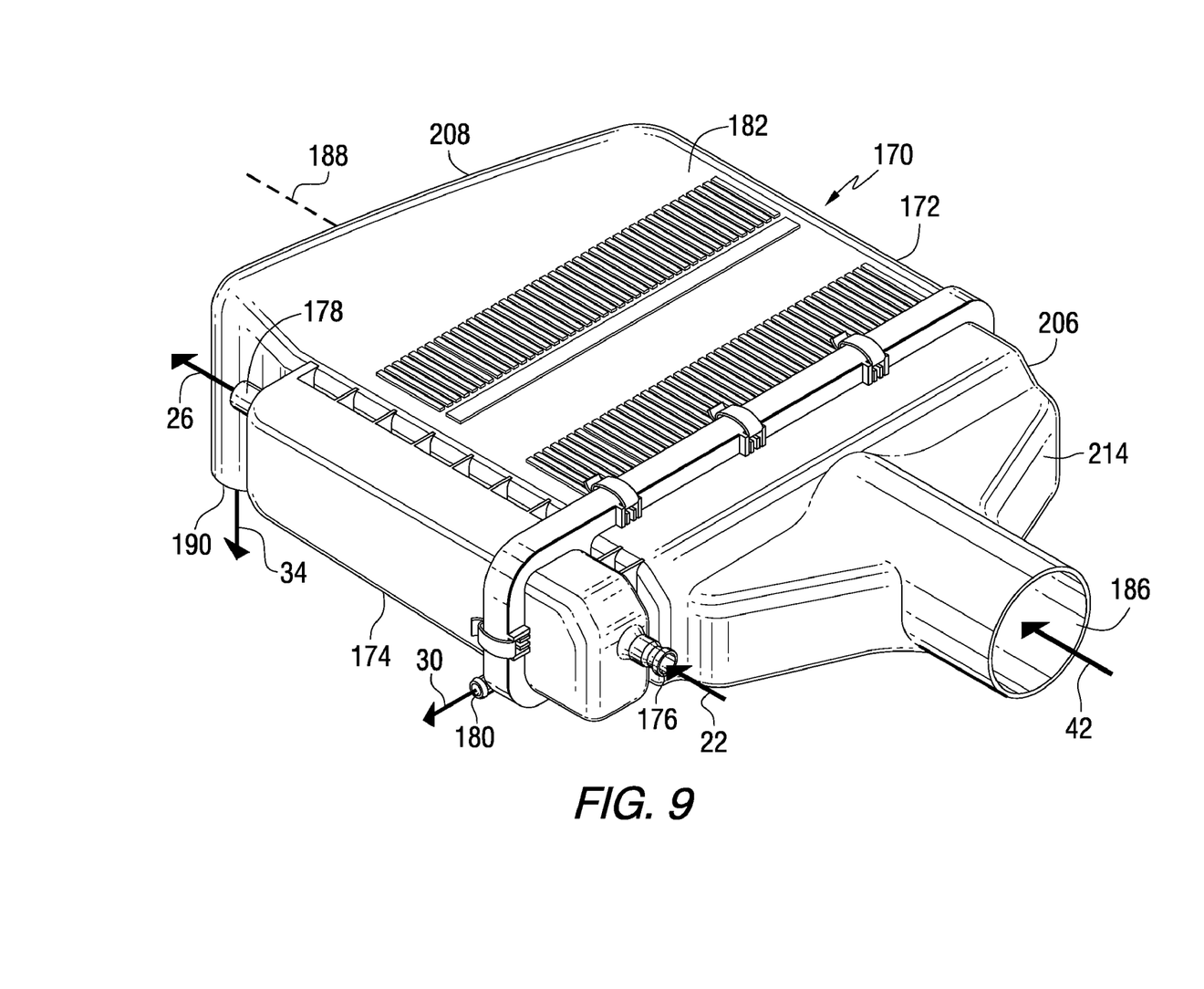
FIG. 9 is a perspective view of a further embodiment.
Figure 10:
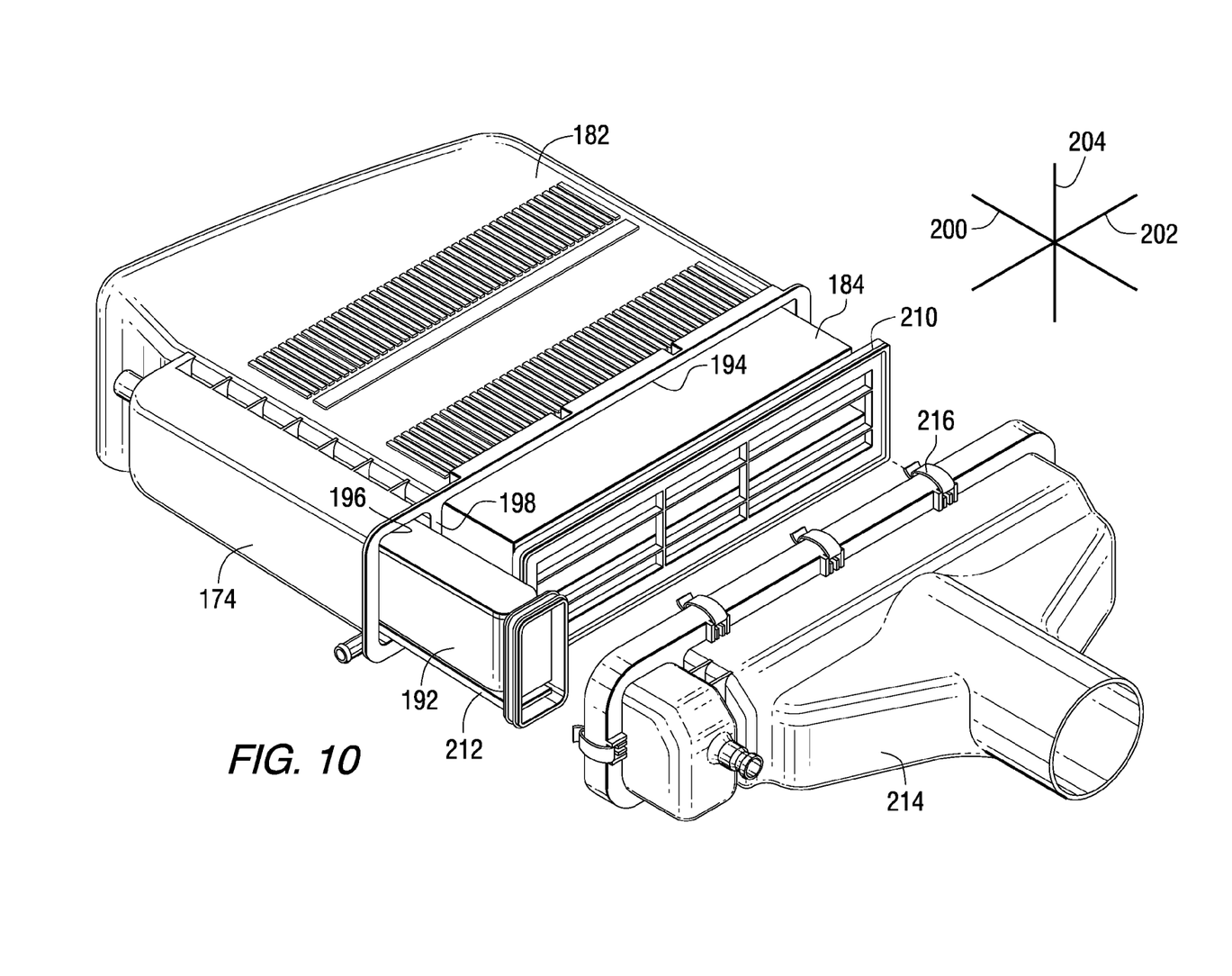
FIG. 10 is a partially exploded view of the assembly of FIG. 9.

FIGS. 9 and 10 show a further embodiment and use like reference numerals from above where appropriate to facilitate understanding. Engine intake air management system 170 is provided for internal combustion engine 12 as above, which engine generates blowby gas in a crankcase 14 containing engine oil and oil aerosol. The system includes a combined crankcase ventilation filter and air cleaner at housing 172. The system includes an air-oil separator 174 having an inlet 176 receiving blowby gas and oil aerosol as shown at arrow 22 from crankcase 14, and having an air outlet 178 discharging clean blowby gas as shown at arrow 26, and having an oil outlet 180 discharging scavenged separated oil as shown at arrow 30 back to crankcase 14. The system further includes a combustion air intake as above supplying combustion air to engine 12 as shown at arrow 34 to air intake manifold 36, or to a turbocharger or supercharger, etc. The combustion air intake includes an air filter 182 including an air filter element 184 receiving incoming ambient air at inlet 186 as shown at arrow 42, which air is then filtered by flowing axially leftwardly along axis 188 through air filter element 184 and then to outlet 190 as shown at outlet arrow 34. Air-oil separator 174 is preferably provided by coalescing filter media element 192.

Housing 172, FIGS. 9, 10, has first, second, third, fourth and fifth ports 186, 176, 190, 180, 178, respectively. First and second ports 186 and 176 are inlet ports. Third, fourth and fifth ports 190, 180 and 178 are outlet ports. Housing 172 has first and second chambers 194 and 196. First chamber 194 contains air filter element 184. Second chamber 196 contains coalescer filter element 192. Combustion air flows from upstream to downstream through port 186 as shown at arrow 42 then through the air filter in first chamber 194 then through port 190 as shown at arrow 34 to engine 12. Blowby gas and oil aerosol flow as shown at arrow 22 through port 176 to the air-oil separator provided by coalescer filter element 192 in chamber 196. Clean blowby gas flows through outlet port 178 as shown at arrow 26 and may be vented to atmosphere (OCV) or may be returned to the engine (CCV). Scavenged separated oil is discharged at drain port 180 as shown arrow 30 for return to crankcase 14.

Housing 172 extends axially along axis 188. First and second chambers 194 and 196 extend axially and are laterally aligned in side-by-side relation. The housing has an axially extending dividing wall 198 laterally between and separating and isolating first and second chambers 194 and 196. In the embodiment in FIGS. 9 and 10, the air filter is a flat panel air filter having an axial length along axial direction 200 along axis 188, a lateral width along a lateral direction 202, and a transverse height along a transverse direction 204. The noted height is less than each of the noted length and width. Second chamber 196 is laterally adjacent first chamber 194 along the noted lateral direction 202 on the opposite lateral side of dividing wall 198. First and third ports 186 and 190 are in first chamber 194. Second, fourth and fifth ports 176, 180 and 178 are in second chamber 196.

Housing 172 extends axially along the noted axial direction 200 between distally opposite first and second axial ends 206 and 208. The noted first and second ports 186 and 176 are at first axial end 206. The noted third and fifth ports 190 and 178 are at second axial end 208. Flat panel air filter element 184 has an axial end 210 at the noted first axial end of the housing. Coalescer filter element 192 has an axial end 212 at the noted first axial end of the housing. The first axial end of the housing is preferably provided by one or more end caps 214 removable from the housing, e.g. at clamps such as 216, to provide service access to flat panel air filter element 184 and coalescer filter element 192 at the noted respective axial ends thereof 210 and 212. The noted one or more end caps 214 may be provided by a single unitary end cap as shown, or may be split into two end caps, one for air filter element 184, and the other for coalescer filter element 192. First and second ports 186 and 176 extend through the noted one or more end caps. Various types of air filter elements and coalescer filter elements may be used, for example an air filter element in accordance with U.S. Pat. Nos. 6,375,700 and 7,314,558, and a coalescer filter element in accordance with U.S. patent application Ser. Nos. 11/940,626, 11/940,729, 12/026,720, all incorporated herein by reference.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Annular includes cylindrical, elliptical, oval, racetrack, and other closed-loop shapes.

What is claimed is:

1. An engine air management system for an internal combustion engine generating blowby gas in a crankcase containing engine oil and oil aerosol, said system comprising a combined crankcase ventilation filter and air cleaner comprising an air-oil separator having an inlet receiving blowby gas and oil aerosol from said crankcase, and having an air outlet discharging clean blowby gas, and an oil outlet discharging scavenged separated oil, said system further comprising a combustion air intake supplying combustion air to said engine, said combustion air intake including an air filter supplying clean combustion air to said engine, wherein said air outlet of said air-oil separator supplies clean blowby gas to said combustion air intake, said combined crankcase ventilation and air filter comprising a housing comprising an axially extending duct, said air-oil separator comprising an annular coalescer filter having a hollow interior extending axially in said duct, said blowby gas flowing primarily in a radial direction through said annular coalescer filter and becoming clean blowby gas and joining said combustion air in said hollow interior radially inwardly of said annular coalescer filter.

2. The engine air management system according to claim 1 wherein said clean blowby gas exits radially from said annular coalescer filter.

3. The engine air management system according to claim 2 wherein said annular coalescer filter has upstream and downstream surfaces facing radially distally oppositely from each other, and said clean blowby gas exits along a radial direction from said downstream surface.

4. The engine air management system according to claim 3 wherein said downstream surface of said annular coalescer filter faces radially inwardly toward said hollow interior.

5. The engine air management system according to claim 4 wherein said duct has an axially extending centerline, and said downstream surface of said annular coalescer filter faces radially inwardly toward said centerline.

6. An engine air management system for an internal combustion engine generating blowby gas in a crankcase containing engine oil and oil aerosol, said system comprising a combined crankcase ventilation filter and air cleaner comprising an air-oil separator having an inlet receiving blowby gas and oil aerosol from said crankcase, and having an air outlet discharging clean blowby gas, and an oil outlet discharging scavenged separated oil, said system further comprising a combustion air intake supplying combustion air to said engine, said combustion air intake including an air filter supplying clean combustion air to said engine, wherein said air outlet of said air-oil separator supplies clean blowby gas to said combustion air intake, said combined crankcase ventilation filter and air cleaner comprising a housing comprising an axially extending duct comprising first, second and third ports, said first port of said duct supplying combustion air to said air filter, said second port of said duct supplying said blowby gas and oil aerosol to said air-oil separator, said third port of said duct supplying clean combustion air to said engine, said first and third ports of said duct being coaxially aligned.

7. The engine air management system according to claim 6 wherein said duct has an axially extending centerline, and said first and third ports of said duct are coaxially aligned along said centerline of said duct.

8. The engine air management system according to claim 6 wherein said duct has an axially extending centerline, and said air-oil separator comprises an annular coalescer filter having a hollow interior extending axially in said duct and centered on said centerline of said duct, said blowby gas flowing radially through said annular coalescer filter and becoming clean blowby gas and joining said combustion air in said hollow interior at said centerline of said duct.

* * * * *

UNITED STATES PATENT AND TRADEMARK OFFICE
CERTIFICATE OF CORRECTION

PATENT NO. : 8,342,160 B2  
APPLICATION NO. : 13/434973  
DATED : January 1, 2013  
INVENTOR(S) : Scott P. Heckel et al.

Page 1 of 1

It is certified that error appears in the above-identified patent and that said Letters Patent is hereby corrected as shown below:

Title page item [75] please correct the third inventor's first name as follows:

Item [75] Inventors:

Delete "Scvott W. Schwartz" and substitute therefor --Scott W. Schwartz--

Signed and Sealed this  
Fifth Day of February, 2013

Teresa Stanek Rea  
*Acting Director of the United States Patent and Trademark Office*